United States Patent
Ramacher et al.

[11] 3,872,657
[45] Mar. 25, 1975

[54] HARVESTER PICK-UP

[75] Inventors: Barry Ramacher, Stockton; Marvin L. Pack, Linden, both of Calif.

[73] Assignee: Ramacher Manufacturing Company, Linden, Calif.

[22] Filed: July 20, 1973

[21] Appl. No.: 381,150

[52] U.S. Cl. .............................. 56/328 R, 56/364
[51] Int. Cl. ............................................ A01d 51/00
[58] Field of Search ............. 56/328 R, 364, 30, 13.2

[56] References Cited
UNITED STATES PATENTS

| | | | |
|---|---|---|---|
| 2,460,029 | 1/1949 | Ramp | 56/13.2 |
| 2,928,225 | 3/1960 | Spencer | 56/328 R |
| 3,397,522 | 8/1968 | Sanderson et al. | 56/30 |
| 3,468,112 | 9/1969 | Landgrebe | 56/330 X |
| 3,791,117 | 2/1974 | Lawrence | 56/98 |

Primary Examiner—Russell R. Kinsey
Attorney, Agent, or Firm—Lothrop & West

[57] ABSTRACT

A harvester pick-up particularly for retrieving fallen nuts and fruits, such as almonds, oranges and the like, from the ground includes a mobile frame preferably self-propelled or tractor drawn and having a primary rotary brush generally in contact with the ground and mounted on the frame for rotation transversely at the leading end thereof. Also disposed on the frame is a power driven secondary brush parallel to and behind the primary brush and arranged so that the tines on the brushes interdigitate or interrelate and operate in such a direction that they pick up materials from the ground between them and toss the picked-up materials onto a reflecting panel from which the materials are deposited onto a primary conveyor belt leading rearwardly. A stream of air is impelled to flow along the primary conveyor and assists in lifting lighter waste materials therefrom. The air current is induced by a fan which takes some of the lighter waste materials and discharges them ultimately to the atmosphere, whereas the primary conveyor takes the intermixed heavier materials, including the nuts or fruit, on an incline and discharges such mixed materials into a generally vertically extending separator column on the frame. An upwardly traveling draft of air, induced by the fan, flows through the separator column and produces a further separation of the lighter, irregularly shaped materials from the heavier, uniformly shaped materials. The heavier materials descend through the relatively wide separator column and are converged by rollers to fall onto a relatively narrow secondary conveyor belt. The nuts, or fruit, on the secondary conveyor are lifted and discharged at the rear of the machine.

3 Claims, 4 Drawing Figures

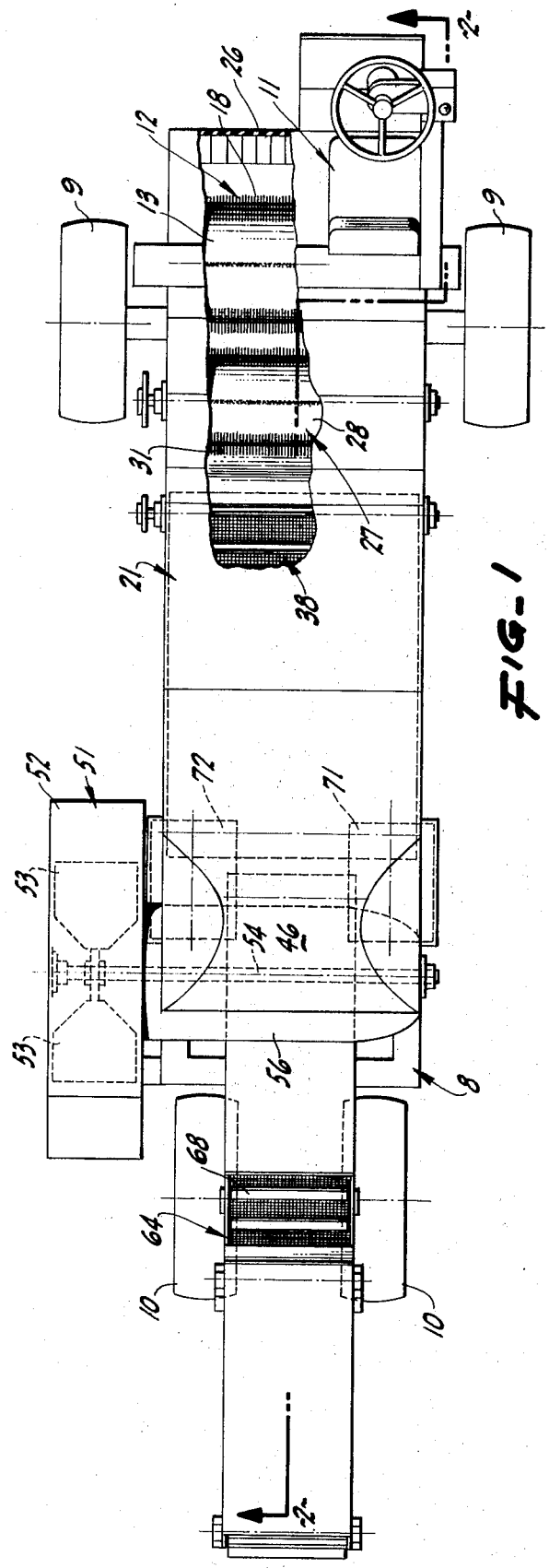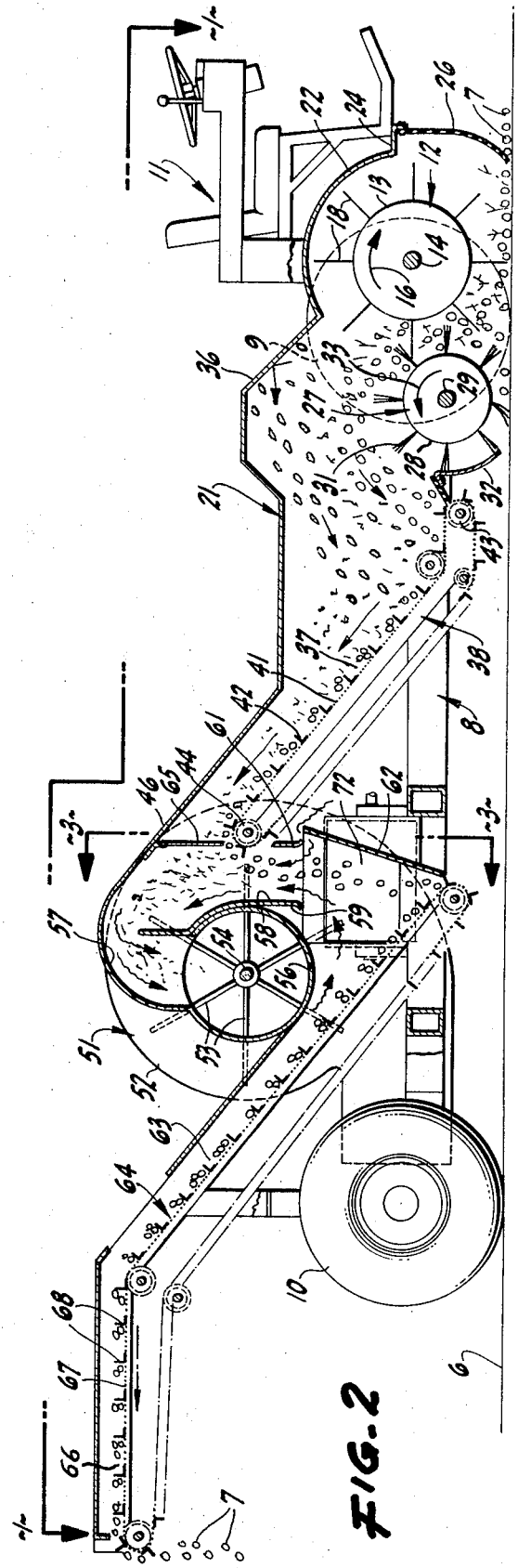

HARVESTER PICK-UP

In the harvesting or gleaning of various articles from the ground, such as fresh fruits, almonds, walnuts and the like, the material picked up includes not only the nuts or fruits themselves, which are desired, but also includes a large amount of miscellaneous debris such as leaves, twigs, rocks, clods and the like and furthermore usually includes some dust intermixed with or on the desired material. Although many different kinds of fruit, or nut, pick-up devices have been made and utilized for years, it is still a problem to pick up the desired materials with a minimum amount of contaminants and then to handle the picked up materials in a machine in such a fashion that the desired constituents are segregated and ultimately discharged for further handling while the undesired constituents, such as leaves, twigs, dust and the like are rather promptly separated from the desired materials and are discharged either to the ground or to the atmosphere or at least are taken out of the path of treatment.

It is therefore an object of the invention to provide an improved harvester pick-up which is quite effective to retrieve the wanted materials from the ground with a relatively small amount of deleterious material and to rid itself of the deleterious material fairly promptly in the handling operation so that the ultimate and final parts of the harvesting operation are concentrated on the desired materials.

A further object of the invention is to provide a harvester pick-up which is simply and compactly made in order to handle a relatively large volume of materials without occupying a great deal of space in the orchard of other pick-up area, and without leaving residual amounts of material at the end of each row being harvested.

A further object of the invention is to provide a harvester pick-up which produces an excellent separation between the relatively heavy, regular, wanted materials and the relatively light, irregular, unwanted materials.

A further object of the invention is to provide a harvester pick-up in which the opening parts are simple and straightforward and can easily be manufactured and serviced yet which endure well and are quite effective to handle the requisite materials.

Another object of the invention is to provide a harvester pick-up which is relatively curtailed so that the materials are relatively quickly handled and are made promptly available for further treatment.

A still further object of the invention is to provide a harvester pick-up especially adapted to retrieve nuts or fruits from the ground and to discharge such desired materials in effective, cleaned condition.

Other objects, together with the foregoing, are attained in the embodiment of the invention described in the accompanying description and illustrated in the accompanying drawings, in which:

FIG. 1 is a plan of a harvester pick-up constructed pursuant to the invention, certain portions being broken away to disclose the interior construction and certain portions being shown in cross-section, as indicated by the lines 1—1 of FIG. 2;

FIG. 2 is a cross-section on a longitudinal vertical plane through the machine, the plane of section being indicated by the line 2—2 of FIG. 1;

Figure 3:
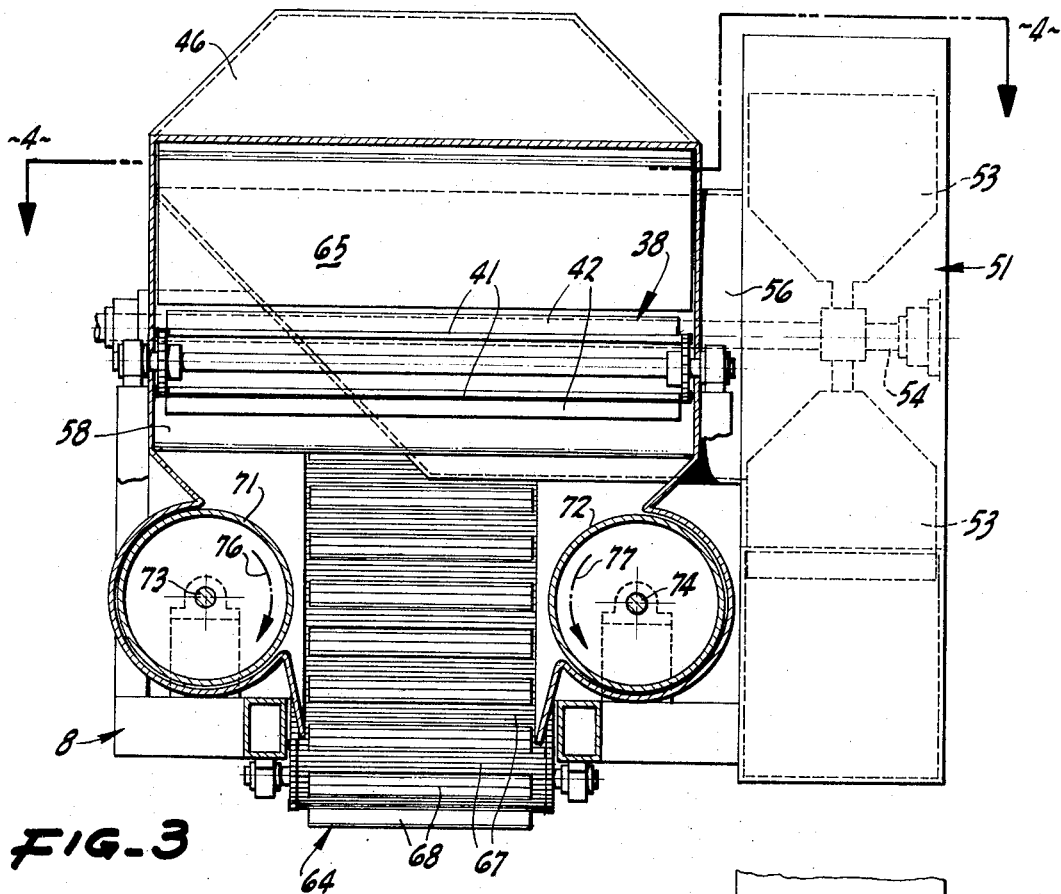
FIG. 3 is a cross-section on a vertical transverse plane, the plane of section being indicated by the line 3—3 of FIG. 2.
Figure 4:
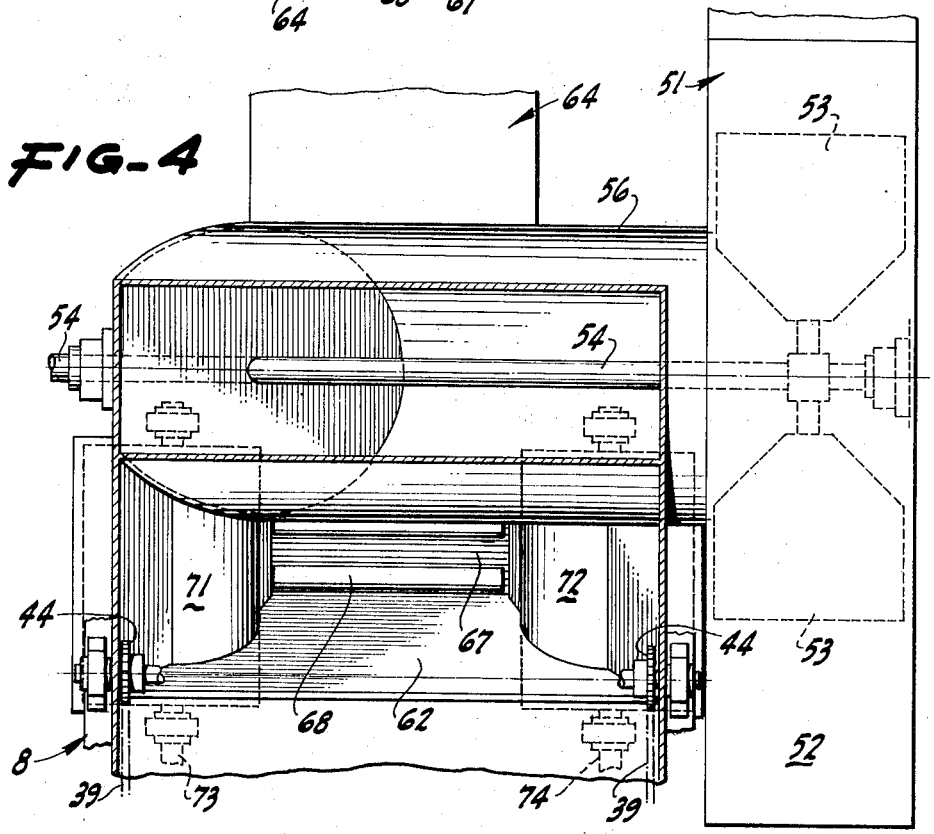
FIG. 4 is a cross-section, the plane of which is indicated by the line 4—4 of FIG. 3.

While the harvester pick up pursuant to the invention is readily adaptable to use in various different environments for picking up various different products available for harvesting and lying on the ground, it has with substantial commercial success been embodied as shown herein for use in an orchard for the purpose of picking up nuts, such as almonds, from the ground. In this particular environment, the machine operates on the ground 6 on which the various nuts 7 are deposited along with incidental leaves, twigs, debris of miscellaneous sorts, dust and the like, not specifically illustrated in detail. The machine itself includes a frame 8 which is mobile in that it is supported for advancement on ground engaging wheels and is designed to be self-propelled or, if desired, to be advanced by means of an appropriate tractor. Customarily, the front wheels 9 are power driven while the rear wheels 10 are dirigible and are steered by an operator at a driving station 11 so that the device is self-contained and self-propelled.

It is to be recognized that while the description of the present embodiment frequently refers to harvesting a crop of nuts, such as almonds, the machine can also be used to advantage in picking up fresh fruits, such as oranges and the like.

For the purpose of picking up the desired materials and other undesired materials admixed with them, the frame at its forward end carries a primary brush 12, or primary reel, as the rotating pick-up member is interchangeably designated. This is particularly constituted of a rotary drum 13 mounted on a shaft 14 journaled on the frame 8 and designed to be power driven in a clockwise direction as indicated by the arrow 16, in FIG. 2. From the drum 13 there project tines 18 of any suitable sort. These can be flexible wires or the like but conveniently are of relatively soft yielding material, such as rubber fingers or wire fingers covered with rubber. The tines have some substantial flexibility or yieldability so that although they can engage with the ground, they deflect reasonably well and do not absorb excessive power. The primary reel 12 is partially housed by a casing 21 mounted on the frame and having an arcuate portion 22 substantially encompassing about a quarter of the upper portion of the primary reel. The housing 21 terminates in a flat, transversely extending front portion 24. A flexible curtain 26 conveniently fabricated of a plurality of pliant rubber strips depends from the portion 24. Any miscellaneous materials shown by the primary reel are nevertheless confined within the housed portions of the machine.

Especially pursuant to the invention there is mounted on the frame 8 just behind the primary brush 12, or reel, a secondary brush 27, or reel. This includes a drum 28 mounted on a transverse shaft 29 journaled on the frame 8 and arranged to be power driven. The secondary reel includes fingers 31, or tines, of any convenient sort, preferably of the same general nature as those in the primary reel. Preferably the tines 31 include a relatively short and stiff leading finger and a relatively long and resilient trailing finger, comparable to the dual finger construction disclosed in L. Ramacher, et al., U.S. Pat. No. 2,854,808, but devoid of the helical auger aspect of the relatively short fingers shown in the patent. The tines 18 on the primary reel 12 are separated from the tines 31 on the secondary reel 27 so that the material being lifted is engaged by the leading faces of the respective sets of tines and impelled thereby against the opposite reel, the material thus being tossed back and forth between the reels until it merges above the reels at a very substantial velocity.

The shafts 14 and 29 are preferably so arranged and driven in timed relation such that the reel tines in effect interleave or interdigitate. The ends of the tines of the reel 12, for example, come very close to or touch the drum 28, whereas the ends of the tines 31 come quite close to or touch the drum 13. The secondary reel 27 is driven in a counterclockwise direction, as shown by the arrow 33 in FIG. 2, and is positioned so that its tines can touch the ground but yield in contact therewith. Just behind the secondary reel there is provided a part of the housing 21 in the form of an arcuate transverse guide plate 32 nearly touching the ground, spanning the frame and within brushing distance of the tines 31. At its forward end, the guide plate 32 is so inclined that all material between the drum 28 and the plate 32 is forcefully impelled by the fingers 31 in a direction such that the material passes forwardly below the drum 28 and into the reel pick-up area where it is again operated on by the dual reel pickup mechanism. As a result, no material can escape and be left behind the secondary reel 27.

In the operation of this part of the mechanism, the two reels 12 and 27 are driven oppositely and in synchronism so that the tines although interdigitating do not substantially interfere with each other. The two groups of tines tend to brush materials 7 on the ground toward the rear, as forced by the primary reel 12, and forwardly as forced by the secondary reel 27. The net result of this operation is that virtually all of the desired material on the ground and some of the admixed debris is picked up from the ground and is lifted in a relatively low trajectory and is either thrown directly in a generally vertical direction of caroms off the drums 13 and 28 and is eventually thrown generally upwardly. There is a rearward component to the travel path of the picked up and thrown bodies since the reel centers and sizes are chosen to provide an incline in that direction. In other words, by making the secondary reel smaller in diameter, the material which is picked up off the ground and lifted by a back and forth "ping pong" action from one brush to the other emerges from the brushes with a generally rearward component, as appears most clearly in FIG. 2.

There is a quite thorough pick up of ground material as the machine advances. Substantially no materials are left behind to emerge beneath the lower edge of the plate 32. The materials picked up are directed generally upwardly and rearwardly at widely divergent angles and velocities. Those with a large lift strike against and carom off a deflecting portion 36 of the housing 21. This portion has various planar facets which follow approximately an arcuate path and are variously angled and directed. Materials hitting them carom off at approximately equal angles and are directed to travel toward the rear and onto the upper run 37 of a primary conveyor 38.

Unlike prior pickup mechanisms which depend upon a significant depth of material before the pickup fingers can get sufficiently underneath the material in order to scoop or throw it onto a conveyor, our dual reel arrangement is capable of acting upon even a single nut at ground level. This is accomplished by the coaction between the two contra-rotating brushes wherein one brush can strike the material on the ground and impel it toward the other brush at a low angle of inclination. Upon striking the other upwardly moving brush, the material is caromed off at a sharply increased angle and either ejected rearwardly and upwardly or thrown back, in turn, to the upwardly moving fingers of the opposite brush and thence deflected upwardly and rearwardly toward the primary conveyor 38 or toward the deflector panels 36, as indicated by the directional arrows in FIG. 2. This ability to clear all material on the ground quickly and thoroughly not only allows the machine to handle a very large volume of material but also eliminates the residual piles at the row ends which is characteristic of prior machines.

The primary conveyor is conveniently comprised of a pair of side chains 39; for example, which have cross bars 41 extending between them at frequent intervals. The side chains likewise have upstanding flights 42 secured thereto and extending between them at relatively close intervals. The side chains are positioned and held by pairs of sprockets 43 and 44 appropriately mounted on the frame and appropriately driven. The upper run 37 of the primary conveyor moves horizontally and rearwardly in its forward portion just behind the plate 32 and then moves upwardly and rearwardly at a relatively steep incline, the bars 41 and the flights 42 serving to retain the larger heavier materials, particularly the desired nuts. The smaller, heavier materials fall by gravity between the successive bars 41 and eventually fall to the ground. Retained materials, however, are carried upwardly and rearwardly. They travel between the upper run of the primary conveyor and a closure 46 extended from the housing 21 and from the faceted portion 36.

In order to provide an appropriate air flow within the confines of the housing 21 and the closure 46, a rotary fan 51 is mounted on the frame 8. The fan 51 is appropriately driven from a suitable engine (usually the propulsion engine) and includes a scroll casing 52 in the customary fashion having a central inlet and a tangential discharge. The fan likewise incorporates rotary blades 53 mounted on a shaft 54 disposed transversely of the frame and extending through a drum-like inlet housing 56 connecting to the fan inlet.

Especially in accordance with the invention the inlet housing 56 is augmented by an arcuate, closed end duct 57. This opens generally into a vertically arranged separator column 58 having closed ends and defined between a pair of vertically extending side walls 59 and 61 curved to afford a venturi inlet. The side wall 61 is interrupted to provide a discharge for the primary conveyor in a location near the top of the column 58.

When the fan 51 is in operation, air is induced to flow into the interior of the housing 21 partially pest the shield 26 in the front but also and particularly from the ground area beneath the primary and secondary brushes. The induced flow travels along the channel between the upper run 37 of the primary conveyor and the housing 46. Dust, leaves, twigs and comparable light materials are sucked through the housing 46 and toward the upper portion of the separator column 58. The light, more aerodynamically responsive materials are drawn out through the duct 57 and the housing 56 to the fan inlet. They are then sent to the atmosphere from the fan outlet. The effect of the air flow and the open conveyor is to leave on the upper run of the primary conveyor the desired materials, that is, the nuts themselves, relatively free of attendant debris. The interruption in the side wall 61 can be partially blocked or directed by a preferably flexible damper 65 adjustable to regulate and apportion air flow to the fan.

The heavy materials, such as nuts, which round the upper end of the upper run of the primary conveyor are discharged toward the center upper portion of the separator column 58. They fall by gravity through the column. There is a rising air flow in the column since the upper portion of the column is open to the fan inlet and the bottom portion of the column is open indirectly to the atmosphere.

Materials which have an appropriate mass-area ratio so as to be able to fall counter to the rising air current in the separator column fall onto and are partially deflected by a base plate 62 extending downwardly and rearwardly from a point close to the lower portion of the wall 61. There is a slight gap to allow an inrush of air near the top of the lower run of the primary conveyor in order to make sure that there is no deleterious discharge of wanted materials at that area.

This separator mechanism provides for a counter current travel of purging air upwardly in the separator column and a downward gravital travel of the relatively heavy wanted materials. Excellent cleaning and separation is so obtained. The falling heavy items then carom off of the base plate 62 and are received by the upper run 63 of a secondary conveyor 64. This includes a belt 66 having a plurality of transverse round bras 67 and flights 68 thereon. The upper run has an upwardly and rearwardly inclined ramp and a rearward, horizontal ramp leading to a convenient point of discharge; for example, into a trailer (not shown) located behind the frame 8.

There is adequate space between the upper run 63 and the lower end of the separator column and there is also substantial space between the upper run of the secondary conveyor and the housing 56 for atmospheric air to flow to the fan. There is an approximately horizontal path for air inflow to supply the separator column and eventually to flow through the fan mechanism. The defined spaced afford a relatively large plenum or chamber for the final cleaning and separation of looser materials from the desired items.

Largely in order to utilize a relatively narrow secondary conveyor 64, yet to afford a relatively wide dimension for the primary conveyor and the separator colunm, it is arranged that nuts discharging from the wide separator column onto the narrow conveyor 64 travel immediately between a pair of counterrotating, power-driven, guide drums 71 and 72, as shown in FIG. 3. It has heretofore been difficult to have falling materials travel from a relatively wide space, such as the primary conveyor, onto a relatively narrow space, such as the secondary conveyor, without bridging or wedging and thus interfering with the advancement of the materials.

We avoid the difficulty by providing on the frame a pair of shafts 73 and 74 appropriately driven and respectively rotating oppositely in the direction of the arrows 76 and 77. On the shafts are the drums 71 and 72 at their top extending substantially from the relatively widely spaced side walls of the housing near the discharge of the primary conveyor and at their adjacent sides extending approximately tangentially to the edges of the upper run 63 of the secondary conveyor. Nuts discharged from the separator column travel onto or fall onto the rollers 71 and 72 and because of their approaching directions of rotation are easily conveyed between the rollers and are readily carried away by the secondary conveyor for ultimate discharge.

It can therefore be seen that although a large quantity of material is initially picked up from the ground, a substantial portion of the unwanted trash is promptly removed even before the air separator column is reached by the bulk of the material. After further separation of the lighter from the heavier material in the vertical air column, the residual desired fraction is relatively small in volume and can thus readily be operated by the constricted throat defined by the oppositely rotating rollers. Consequently, upon reaching the bottom of the separator column, the desired material is funneled into a stream which is efficiently handled by relatively small, closely coupled and inexpensive equipment.

What is claimed is:

1. A harvester pick-up comprising:
   a. a mobile frame;
   b. a primary brush rotatably mounted on said frame transversely at the leading end thereof, said primary brush including tines;
   c. a secondary brush rotatably mounted on said frame behind and parallel to said primary brush, said secondary brush including a drum and a plurality of fingers projecting from said drum and interleaved with said tines, said secondary brush being smaller in diameter than said primary brush in order to direct the material emergent from said brushes in a rearwardly inclined trajectory;
   d. means for contra-rotating said brushes in directions such that the bottom portion of said primary brush moves rearwardly along the ground and the bottom portion of said secondary brush moves forwardly along the ground;
   e. deflector means mounted on said frame and spaced above said brushes for intercepting and deflecting in a rearward direction the material lifted from the ground and propelled upwardly and rearwardly by said brushes;
   f. a conveyor mounted on said frame and extending rearwardly from a location adjacent the after portion of said secondary brush to a discharge location removed therefrom.

2. A harvester pick-up as in claim 1 including an arcuate transverse guide plate mounted on said frame between said conveyor and said secondary brush, said guide plate extending forwardly and downwardly within brushing distance of said fingers to terminate in a leading margin adjacent said bottom portion of said secondary brush, said guide plate in the vicinity of said leading margin being so inclined that all material failing to reach said conveyor and disposed between said guide plate and said drum is impelled by said fingers in a direction such that the material passes forwardly below said drum and toward said rearwardly moving bottom portion of said primary brush.

3. A harvester pick-up as in claim 2 in which said deflector portion includes a plurality of planar facets which follows approximately an arcuate path and are angled to direct the emergent material rearwardly and downwardly onto said conveyor.

* * * * *